Jan. 14, 1958 R. A. RANSOM 2,819,876
COMBINED SAFETY JOINT AND JAR
Filed April 6, 1954
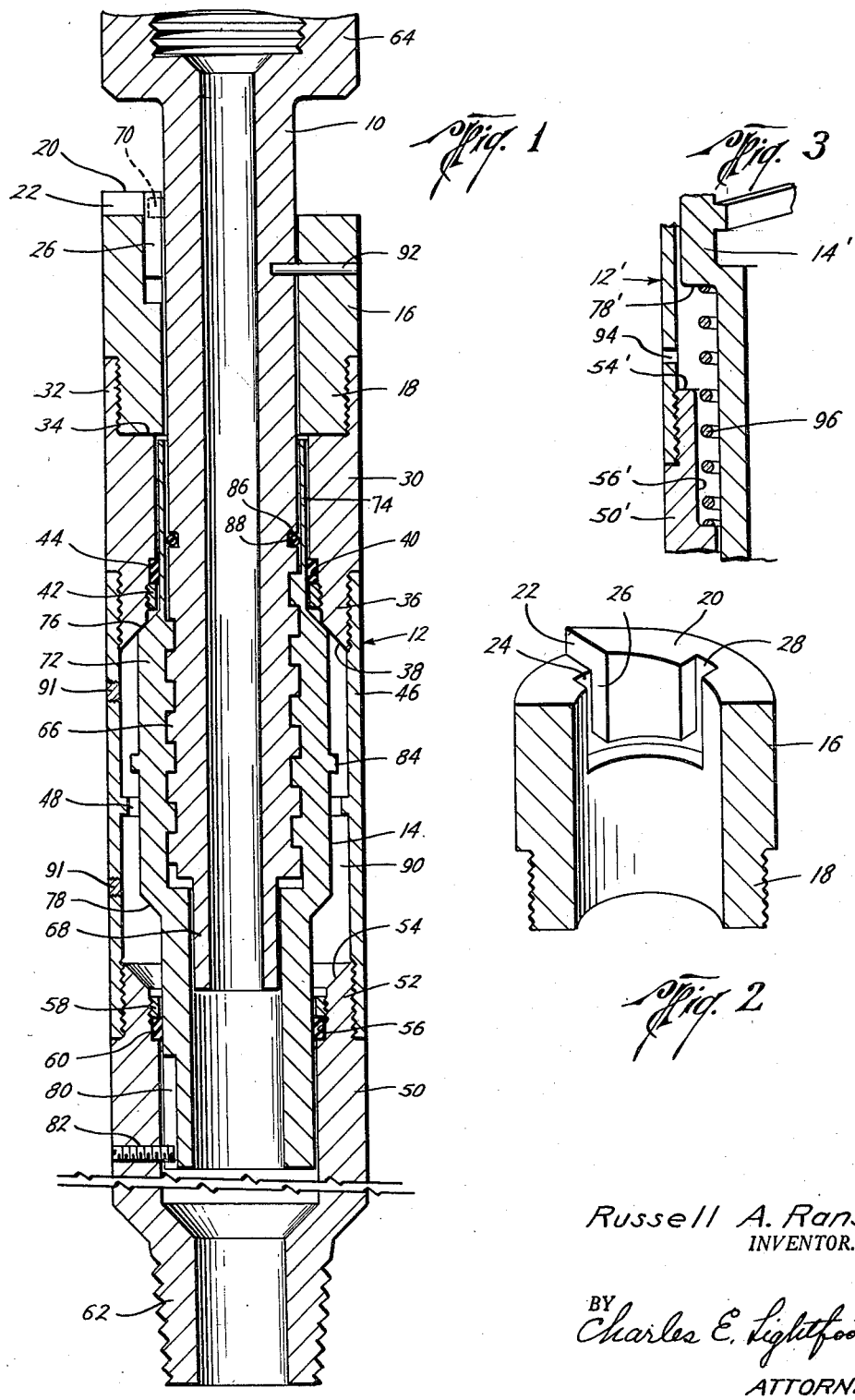
Russell A. Ransom
INVENTOR.
BY Charles E. Lightfoot
ATTORNEY

2,819,876

COMBINED SAFETY JOINT AND JAR

Russell A. Ransom, Houston, Tex.

Application April 6, 1954, Serial No. 421,336

5 Claims. (Cl. 255—27)

This invention relates to a combined safety joint and jar, and more particularly to a coupling device for releasably connecting together two sections of a drilling string or other tubular string of pipe in a manner to enable same to be disconnected by manipulation of the string, and which may also be operated as a jar.

The invention has for an important object the provision of a safety joint which is constructed to enable the parts to be rotated in either direction without danger of the same becoming released, but which may be readily operated by manipulation of the string to place the joint in condition for release by relative rotation of the parts.

Another object of the invention is to provide a safety joint which is adapted to form a threadable connection between two tubular elements and having means which is operable to secure the parts against relative rotation, but which may be operated to permit such relative rotation to allow the parts to be disconnected.

A further object of the invention is the provision of a safety joint which is also constructed for operation to perform a jarring action.

Another object of the invention is to provide a combined safety joint and jar and which embodies means for releasably securing the parts against relative rotation, to prevent accidental separation of the joint, but which is releasable to permit such relative rotation when desired to allow the joint to be separated.

A further object of the invention is the provision of a combined safety joint and jar which is of simple design and rugged construction, by the use of which a tubular string of pipe may be rotated in either direction when desired, which may be readily placed in condition to be disconnected if necessary, and by which a jarring action may be carried out in the event of sticking of the string in a well bore.

The above and other important objects and advantages of the invention will best be understood from the following detailed description, constituting a specification of same, when considered in conjunction with the annexed drawings, wherein—

Figure 1 is a fragmentary central, longitudinal, cross-sectional view of a preferred form of the invention, showing the safety joint with the parts in assembled relation, and in condition to permit rotation of the tubular string in either direction;

Figure 2 is a detail view illustrating one part of the interlocking mechanism of the safety joint, showing the construction of the same whereby the parts of the joint are releasably held against relative rotation; and Figure 3 is a fragmentary cross-sectional view, similar to that of Figure 1, illustrating a somewhat modified form of the invention.

Referring now to the drawings in greater detail, the invention as illustrated in Figures 1 and 2, comprises an inner part or mandrel 10, an outer part or housing, generally indicated at 12, and an intermediate part or sleeve 14, which are adapted to be assembled in the manner shown to releasably connect together two adjacent sections of a tubular string of pipe.

The outer part 12 is conveniently formed in several sections, the uppermost of which is a tubular member 16, having a reduced externally threaded portion 18 at its lower end, and a circumferentially sloping upper end face 20, forming a radially extending, vertical, stop shoulder 22. The member 16 is also provided with an internal, substantially U-shaped groove, having a vertically disposed arm 24, terminating at the upper end of the member and provided with a wall portion 26, which is coextensive with the face of the shoulder 22, this groove also having another vertically disposed arm 28, which opens outwardly at its upper end through the end face 20. The member 16 is connected at its lower end to a connector member 30, having an internally threaded counterbored portion 32, whose bottom forms an internal shoulder 34. The lower end of the member 30 is provided with an externally threaded reduced portion 36, terminating in an inwardly beveled end face 38, for a purpose later to be made apparent, and also has a lower end counterbore 40, which is internally threaded to receive a packing retainer ring 42, by which suitable packing, such as that indicated at 44 is retained within the counter-bore.

A tubular shell or barrel member 46, having internally threaded end portions is threadably secured to the lower end of the connector member 30, and is provided mediate its ends with an internal annular projection 48, forming a restriction therein, and to the lower end of this barrel member, a sub 50 is threadably connected, which has an externally threaded reduced portion 52 at its upper end, provided with an inwardly beveled upper end surface 54, for a purpose later to be made apparent. The sub 50 is also provided with an upper end counter-bore 56, which is internally threaded to receive a packing retainer ring 58, whereby suitable packing such as that indicated at 60 is retained in the counter-bore.

The sub 50 has at its lower end a reduced externally threaded pin portion 62, for convenient attachment to the adjacent end of a lower section of a tubular string.

The internal tubular mandrel 10 is provided at its upper end with an internally threaded box portion 64, for attachment to the lower end of an upper section of the tubular string, and is formed with an external coarsely threaded portion 66, which terminates in an externally reduced lower end portion 68. The mandrel also has an external radially projecting lug or projection 70, which is positioned to enter the internal groove of the member 16, when the parts are in assembled relation, as more fully explained hereinafter.

The inner sleeve member 14 is provided with an internal coarsely threaded counterbore portion 72, within which the mandrel is threadably received, the externally reduced lower end portion 68 of the mandrel extending downwardly beyond the bottom of the counterbore. The member 14 also has a tubular portion 74 which extends upwardly within the member 30 in surrounding relation to the mandrel, and is formed with an externally enlarged portion mediate its ends, which terminates in external tapered annular faces 76 and 78 respectively, positioned in opposed relation to the internally beveled faces 38 and 54, respectively, of the member 30 and the sub 50. The outer casing and the sleeve are thus provided with abutments positioned for engagement upon relative longitudinal movement of the sleeve and casing to perform a jarring action. The lower end portion of the sleeve 14 extends into the sub 50 and is provided with an external longitudinal groove 80 therein, into which the inner end of a screw 82, carried by the sub projects, to hold the sub and sleeve against relative rotation. An external annular enlargement 84 is also provided on the sleeve 14, mediate its ends, forming a piston thereon, and the sleeve is mounted for longitudinal movement within the outer shell or casing member 46 to bring the external tapering faces 76 and 78 into contact with the respective internal tapering faces 38 and 54. During such longitudinal movement of the sleeve, the external annular projection 84 passes through the internal annular projection 48 of the barrel member 46, and the external projection 84 is preferably of only slightly less external diameter than the internal diameter of the internal projection 48. Mandrel 10 may also be provided with an external groove 86, for the reception of suitable packing means, such as an O-ring 88, positioned to form a fluid tight seal between the mandrel and the inner sleeve 14.

The space between the sleeve and barrel member 46, between the packing 44 and 60, forms a chamber 90, closed at its opposite ends, which may be filled by suitable fluid, such as oil.

In making use of the invention constructed as described above, the parts are assembled in the manner illustrated in Figure 1, with the external lug or projection 70 of the mandrel, extending into the vertically disposed arm 28 of the internal groove of the member 16, and the mandrel and the member 16 are releasably secured together in any convenient manner, as by a frangible element or shear pin 92, extending through the member 16 and into the mandrel 10. The chamber 90 is completely filled with a suitable liquid, such as oil, which may be readily accomplished by removing the plugs 91 in the outer part 12 and replacing the same after the chamber has been filled. In assembling the parts the inner sleeve 14 will be positioned in the outer part, the mandrel being thereafter threadably inserted in the sleeve, until the external lug 70 engages the shoulder 22 of the member 16, and thereafter the mandrel is moved downwardly relative to the outer part to move the lug 70 downwardly in the arm 24 of the internal groove, whereupon the mandrel may be rotated to move the lug through the bottom of the internal groove and thence upwardly within the vertical arm 28 of the groove to the position indicated in Figure 1. With the parts thus assembled the pin 92 is inserted through the member 16 into the mandrel to releasably hold the mandrel against longitudinal movement relative to the outer part. When the lug 70 is in the vertical arm 28 of the groove, the external tapering face 76 of the sleeve 14 will engage the internally tapering face 38 of the member 30 to limit upward movement of the sleeve and mandrel.

The shoulder 22 of the member 16 is of such height, relative to the size of the threads on the mandrel 10 and sleeve 14, that the lug 70 may pass the shoulder at the beginning of the final turn of the mandrel in threading the same into the sleeve, so that the lug 70 engages the shoulder when the mandrel is in its fully inserted position in the sleeve, the parts then being in the positions indicated in Figure 1, so that the mandrel will not thereafter rotate to the right, relative to the sleeve, and the tubular string may be rotated to the right without danger of disconnecting the joint. When the mandrel and sleeve have been moved downwardly in the outer part, to move the lug 70 to the bottom of the vertical arm 24 of the groove, and the mandrel has been rotated to the right to move the lug 70 across the bottom of the groove and into the vertical arm 28 of the groove, the mandrel may then be moved upwardly to position the lug 70 in the vertical arm 28 of the groove, whereupon the tubular string may be rotated in either direction without disconnecting the joint.

In the event that it is desired to disconnect the joint, a downward force may be exerted on the tubular string, to shear the pin 92 and permit the mandrel and sleeve to move downwardly in the outer part. During such downward movement of the sleeve the fluid in the chamber 90 flows past the internal projection 48 from the lower portion of the chamber into the upper portion thereof, and when the sleeve has moved downwardly to the extent that the external projection 84 thereof enters the internal projection 48 the flow of fluid will then be restricted, whereby the tubular string will be placed under compression. As soon as the external projection 84 moves past the internal projection 48 fluid may again flow freely from the lower portion of the chamber 90 to the upper portion thereof, and the sleeve will move downwardly, rapidly to engage the external tapering surface 78 thereof, with the internal tapering surface 54 of the sub 50, to perform a jarring action on the same.

The mandrel 10 may then be moved downwardly to move the lug 70 out of the vertical arm 28 of the groove, and upon rotation of the string to the left the lug may be brought into the vertical arm 24 of the groove, whereupon the mandrel may be moved upwardly and thereafter unscrewed from the sleeve by left hand rotation of the string. When the mandrel has been thus disconnected from the sleeve it may be withdrawn, leaving the sleeve and outer part connected to the lower section of the string.

The safety joint may be reconnected, if desired, by lowering the mandrel into the outer part and rotating the same to the right to reengage the threads of the mandrel with those of the sleeve, until the lug 70 is moved into engagement with the shoulder 22, whereupon the mandrel may be again lowered to move the lug downwardly in the groove and upon further rotation of the mandrel to the right the lug may be moved into position to enter the vertical arm 28 of the groove upon upward movement of the mandrel. In this manner the mandrel may be reconnected to the sleeve and outer part in position to rotate in either direction with the outer part.

In the event that it should be desired to exert a jarring action on the string, either upwardly or downwardly, this may be accomplished by exerting a downward force on the string to shear the pin 92, whereupon the mandrel may be moved downwardly to cause the sleeve to move downwardly with the mandrel to engage the external tapering face 78 of the sleeve with the internal tapering face 54 of the sub 50, to produce a downward jarring action. Similarly an upward jarring action may be exerted by an upward pull on the string, to place the string under tension, to move the external face 76 of the sleeve into engagement with the internal tapering face 38 of the member 30. When jarring either upwardly or downwardly the external projection or piston 84 will enter the restriction formed by the internal projection 48 on the barrel member 46 to restrict the flow of fluid from one end of the chamber 90 into the opposite end thereof whereby a longitudinal force may be exerted on the string which will be released when the piston passes the restriction and the parts thereafter brought into sudden contact to secure a jarring action.

A somewhat modified form of the invention is illustrated in Figure 3, wherein a slightly different form of jarring mechanism is provided. In this form of the invention the construction and arrangement of the parts is substantially the same as that previously described, except that the internal annular projection 48 of the tubular barrel member 46 is omitted, and the external annular projection 84 of the sleeve 14 is also omitted. The inwardly tapering faces of the member 30 and upper end face of the sub 50 being formed substantially at right angles to the longitudinal axis of the joint as indicated at 54′, and the external annular face 78 of the inner sleeve being likewise formed as indicated at 78′. An opening 94 is provided in the barrel member 46, in this form of the invention, through which fluid in the well bore may flow into and out of the chamber 90′ formed between the sleeve member and the barrel member and a resilient element, such as a coil spring, indicated at 96, is disposed between the sleeve member and the sub 50′, the lower end of the spring being positioned in the counterbore 56′ in engagement with the sub, while the upper end of the same is in engagement with the external annular surface 78' of the sleeve.

The operation of this form of the invention is similar to that of the form previously described, the spring 96 being effective to retain the sleeve in its uppermost position in the outer part, whereby the parts are retained in connected condition with the lug 70 in the vertical arm 28 of the groove of the member 16.

When it is desired to disconnect the joint the mandrel may be moved downwardly against the pressure of the spring 96, to move the lug 70 out of the vertical arm 28 of the groove, whereupon the mandrel may be rotated to the left to position the lug to be moved upwardly through the vertical arm 24 of the groove, so that the mandrel may then be rotated to the left to disconnect the joint.

In the event it is desired to perform a jarring action with the modified form of the invention, this may be accomplished by the exertion of a downward force on the string, shearing the pin 92 and moving the sleeve 14' downwardly with the mandrel to engage the external annular face 78' of the sleeve with the upper end face 54' of the sub 50'. In other respects the modified form of the invention is substantially the same as the preferred form previously described.

It will thus be seen that the invention, constructed as described above, provides a combined safety joint and jar structure, which may be operated to permit rotation of the string in either direction without danger of disconnecting the joint, while at the same time the device is readily manipulated by operation of the string to place the same in condition to be disconnected by rotation of the string, or may be operated as a jar when desired to secure a jarring action on the string.

While the invention has been disclosed herein in connection with certain specific embodiments of the same, it will be understood that this is intended by way of illustration only, and that numerous changes can be made in the construction and arrangement of the various parts, without departing from the spirit of the invention or the scope of the appended claims.

Having thus clearly shown and described the invention, what is claimed as new and desired to secure by Letters Patent, is:

1. A combined safety joint and jar comprising inner and outer telescopingly arranged tubular parts movable longitudinally relative to each other, said outer part having an internal groove of substantially U-shape, whose arms open outwardly at their upper ends at the upper end of said outer part, said inner part having a portion shaped to enter said groove and engageable with the outer part in one arm of the groove to hold the parts against relative rotation said inner part being movable longitudinally in one direction in the outer part to position said portion in the bottom of the U and being thereafter rotatable relative to the inner part to position said portion in the other arm of the U to permit said inner part to be moved longitudinally in the outer part in the other direction in the outer part to move said portion out of the groove, a sleeve in said outer part having a threadable connection with said inner part and longitudinally movable therewith relative to the outer part, abutment means on said outer part and sleeve positioned for engagement to limit relative longitudinal movement of the sleeve and outer part in a direction to separate the parts, said inner part and sleeve being movable to a position to move said portion out of said groove, means on said outer part positioned for engagement with said portion when said portion is out of said groove to limit relative rotation of the parts in a direction to connect said inner part with said sleeve, and interengageable means on the outer part and sleeve for holding the outer part and sleeve against relative rotation to permit said inner part to be rotated relative to said sleeve in a direction to disconnect said inner part from the sleeve.

2. A safety joint comprising inner and outer telescopingly arranged tubular parts movable longitudinally relative to each other, said outer part having an internal groove opening outwardly at one end of the outer part, means on said inner part shaped to enter said groove and movable with the inner part to one position relative to the outer part to engage the outer part in said groove to hold the parts against relative rotation and to another position out of said groove to permit such relative rotation of the parts, a sleeve in said outer part having a threadable connection with the inner part and movable longitudinally therewith relative to the outer part, said outer part having a portion positioned for engagement with said means to limit relative rotation of said parts in a direction to connect said inner part with said sleeve, and interengageable means on the sleeve and outer part for holding the sleeve and outer part against relative rotation.

3. A safety joint comprising inner and outer telescopingly arranged tubular parts movable longitudinally relative to each other, said outer part having an internal groove opening outwardly at one end of the outer part, external means on said inner part shaped to enter said groove and movable with the inner part to one position relative to the outer part to engage the outer part in said groove to hold the parts against relative rotation and to another position out of said groove to permit such relative rotation of the parts, a sleeve in said outer part having a threadable connection with the inner part and movable longitudinally therewith relative to the outer part, abutment means on the sleeve and outer part engageable to limit relative longitudinal movement of the sleeve and outer part in a direction to separate the parts, means on said outer part positioned for engagement with said external means when said abutment means are in engagement to limit relative rotation of the parts in a direction to connect the inner part with the sleeve, and interengageable means on the sleeve and outer part for holding the sleeve and outer part against relative rotation.

4. A safety joint comprising inner and outer telescopingly arranged tubular parts movable longitudinally relative to each other, said outer part having an internal groove opening outwardly at one end of the outer part, external means on said inner part shaped to enter said groove and movable with the inner part to one position relative to the outer part to engage the outer part in said groove to hold the parts against relative rotation and to another position out of said groove to permit such relative rotation of the parts, means for releasably securing said inner part in said one position, a sleeve in said outer part having a threadable connection with the inner part and movable longitudinally therewith relative to the outer part, means on said outer part positioned for engagement with said external means when said external means is out of said groove to limit relative rotation of the parts in a direction to connect said inner part with said sleeve, and interengageable means on the sleeve and outer part for holding the sleeve and outer part against relative rotation.

5. A safety joint comprising inner and outer telescopingly arranged tubular parts movable longitudinally relative to each other, said outer part having an internal groove opening outwardly at one end, at one end of the outer part and said inner part having a portion shaped to enter said groove and movable with said inner part to one position for engagement with the outer part in the groove to hold the parts against relative rotation and to another position out of said groove to permit such relative rotation, a sleeve in said outer part having a threadable connection with said inner part and longitudinally movable therewith relative to said outer part, abutment means on the sleeve and outer part positioned for engagement upon relative longitudinal movement of the parts in a direction to move said portion from said one to said other position to limit relative longitudinal movement of the parts in said direction, and means on said outer part positioned to engage said portion to hold the inner part against rotation relative to the outer part in a direction to connect said inner part with said sleeve when said abutment means are in engagement.

References Cited in the file of this patent
UNITED STATES PATENTS

| | | |
|---|---|---|
| 2,039,943 | Wickersham et al. | May 5, 1936 |
| 2,387,682 | Richey | Oct. 23, 1945 |
| 2,678,806 | Brown | May 18, 1954 |
| 2,721,056 | Storm | Oct. 18, 1955 |